FIG. 3

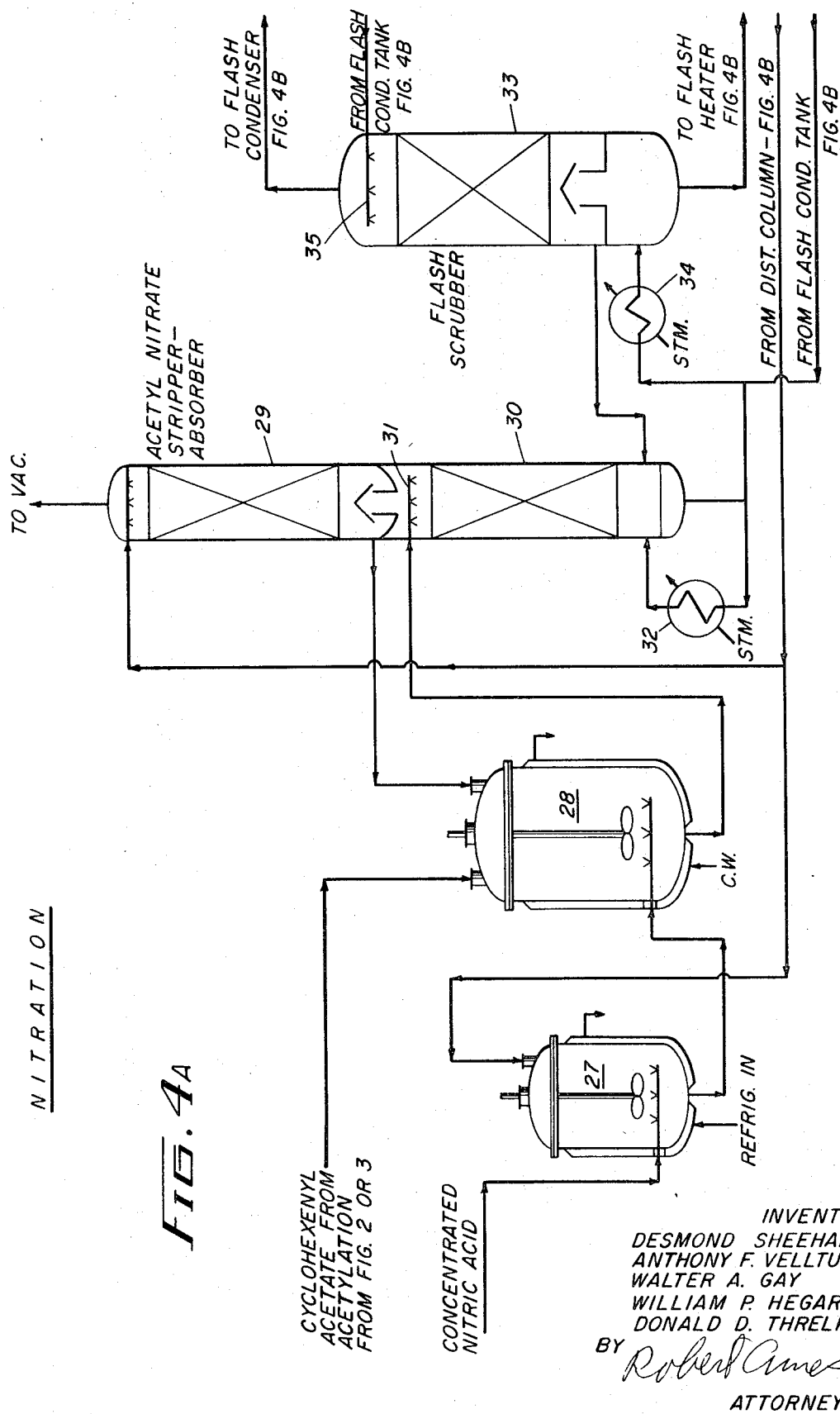

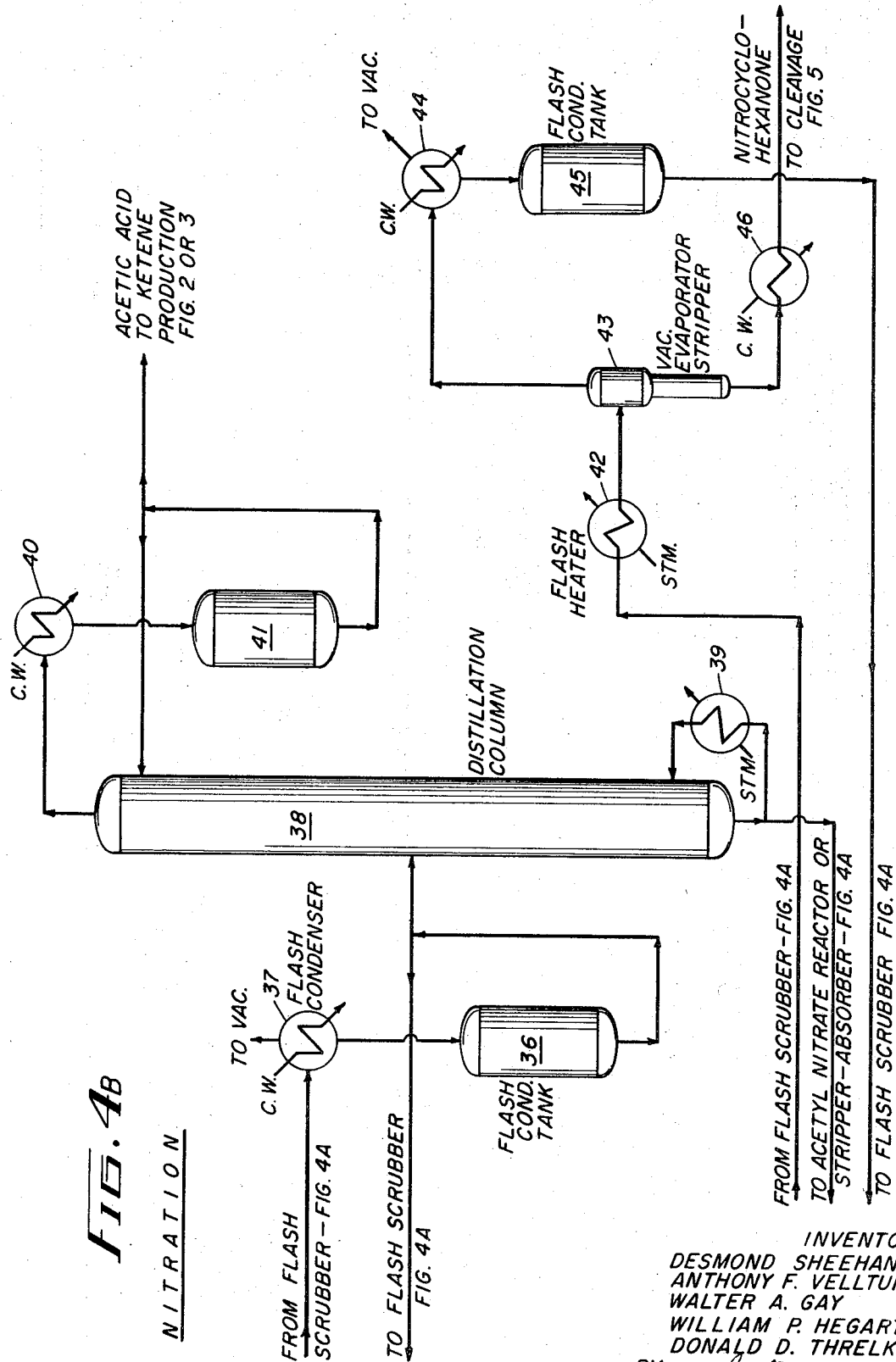

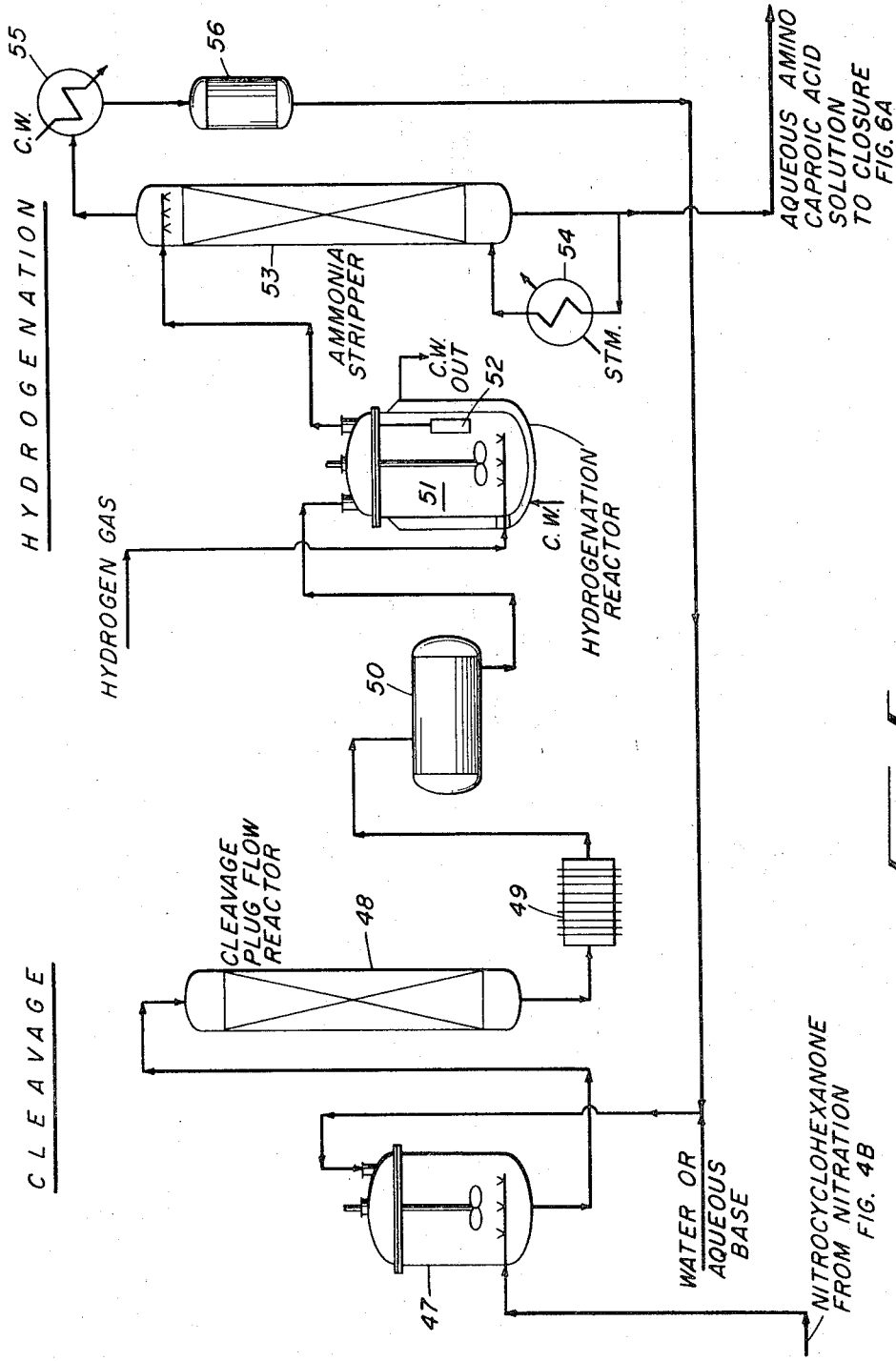

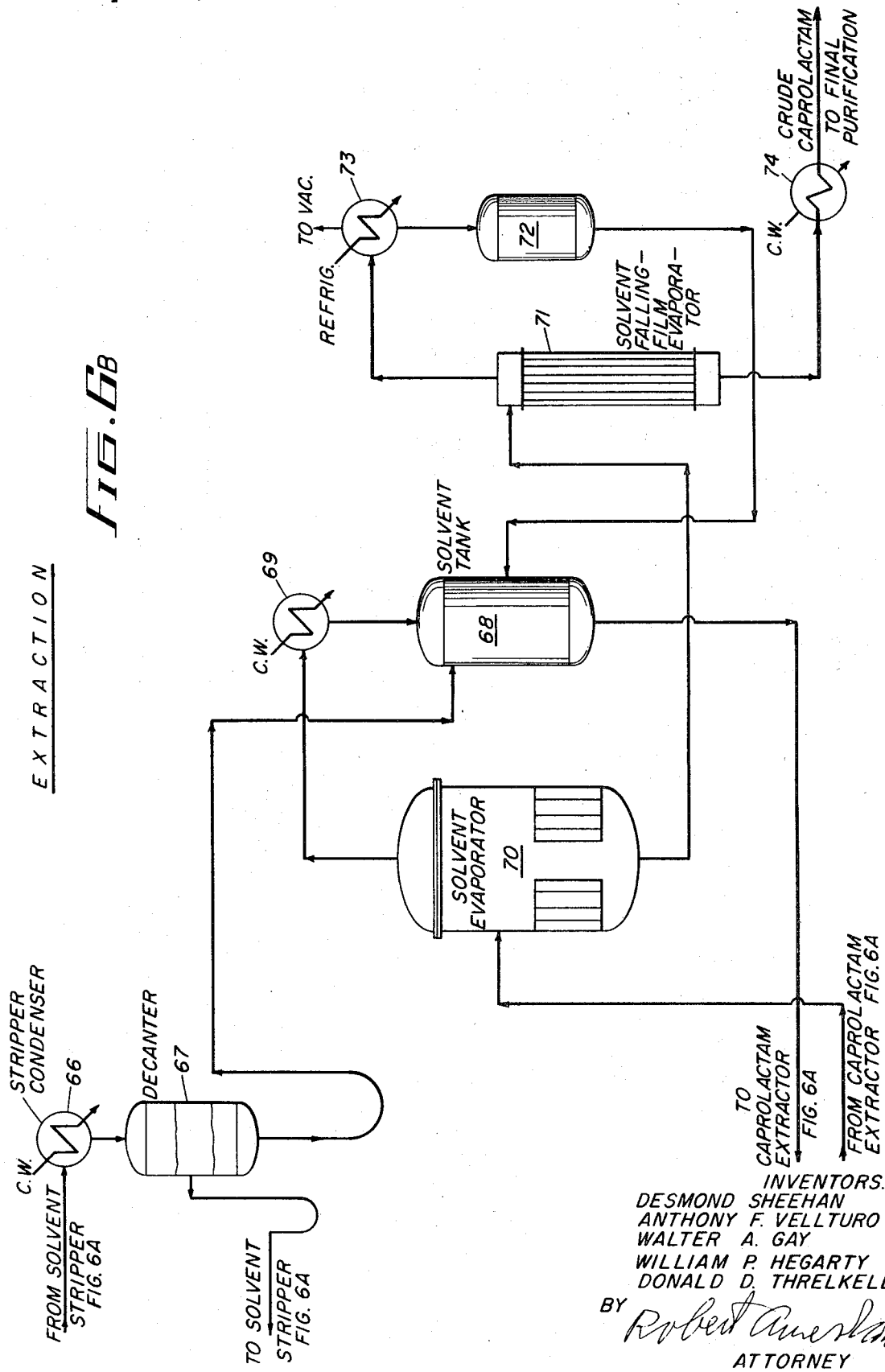

United States Patent Office 3,562,254
Patented Feb. 9, 1971

3,562,254
PRODUCTION OF CAPROLACTAM STARTING
WITH CYCLOHEXANONE
Desmond Sheehan, Hamden, Anthony F. Vellturo and
Walter A. Gay, Cheshire, William P. Hegarty, Hamden,
and Donald D. Threlkeld, Cheshire, Conn., assignors
to The Techni-Chem Company, Wallingford, Conn., a
corporation of Connecticut
Filed Apr. 24, 1969, Ser. No. 818,980
Int. Cl. C07d 41/06
U.S. Cl. 260—239.3         4 Claims

ABSTRACT OF THE DISCLOSURE

A continuous process for the production of caprolactam, including acetylation of cyclohexanone with acetic anhydride and ketene (which reacts with acetic acid formed in the acetylation reaction). The cyclohexenyl acetate formed is then nitrated with concentrated nitric acid and the resulting nitrocyclohexanone separated by distillation. Acetic anhydride is recycled to the acetylation reaction, and acetic acid together with makeup acetic acid is pyrolyzed to ketene, which is also used in the acetylation reaction. The nitrocyclohexanone is then cleaved with ammonium hydroxide to form the ammonium salt of 6-nitro caproic acid, which is then reduced with hydrogen and a hydrogenation catalyst to produce 6-amino caproic acid. This intermediate is then separated by removing ammonia, which is recycled with makeup ammonia to the cleavage reaction. The aqueous 6-amino caproic acid is then heated in dilute aqueous solution, 5% to 25% w./v., to cyclize to caprolactam. The caprolactam is then extracted with an organic solvent, such as trichloroethylene, and the unconverted aqueous amino caproic acid recycle to the cyclization step. Solvent is then removed and the caprolactam purified by known means. An important part of the process is that there is no ammonium sulfate formed, which in earlier processes was an undesirable by-product. The ammonia used in the cleavage reaction is recycled and there is no large loss of raw material.

RELATED APPLICATIONS

While the present application is not technically a continuation-in-part of earlier applications, a number of the individual steps have been described in earlier applications all assigned to the assignee of the present application. Some of these earlier applications were divisions or continuations-in-part of still earlier applications now abandoned, and only the presently existing applications will be referred to here.

The acetylation of cyclohexanone by the use of a mixture of acetic anhydride and ketene is described in the Gay, Sheehan and Vellturo application, Ser. No. 705,535, filed Jan. 30, 1968, now U.S. Pat. No. 3,444,779. Also, an improved acetylation catalyst, hydriodic acid, is described in the application of Gay and Sheehan, Ser. No. 666,468, filed Sept. 8, 1967, now U.S. Pat. No. 3,506,706.

The nitrogen of cyclohexenyl acetate with concentrated nitric acid and acetic anhydride, forming acetyl nitrate, while maintaining conditions so that there is never any significant excess of acetyl nitrate during the nitration reaction is described in the Sheehan and Vellturo application Ser. No. 664,232, filed Aug. 15, 1967.

The step of cleaving nitrocyclohexanone with aqueous bases such as ammonium hydroxide to form 6-nitro caproic acid is described in the Sheehan and Vellturo application Ser. No. 774,208, filed Nov. 7, 1968.

Finally, the cyclization of 6-amino caproic acid to caprolactam by heating a dilute aqueous solution from 5% to 25% is described in the Sheehan application 717,998, filed Apr. 1, 1968 now U.S. Pat. No. 3,485,821.

The above applications are, for the most part, not limited only to reaction with cyclohexanone, its enol acetate, and the production of unsubstituted caprolactam. The reaction steps are described and claimed in many of the applications referred to more broadly and include reactions for the production of other related compounds. The applications are for individual process steps and do not describe a combined overall process which is the subject matter of the present application and which involves modifications and savings of otherwise waste material.

BACKGROUND OF THE INVENTION

Caprolactam has been produced in the past by a process involving a Beckman rearrangement from cyclohexanoneoxime. This was the ordinary commercial process before the series of improvements described and claimed in the related applications above referred to. However, even though these applications permit marked improvements, there is still room for further improvement in an overall process.

SUMMARY OF THE INVENTION

The present invention relates to an overall combined process of producing caprolactam starting with cyclohexanone. It involves the combination of a number of steps, in most cases each involving an effect on the steps preceding and following. Some of the individual steps taken by themselves and without combination with the other steps are described individually in the related applications referred to above. The present invention, however, is a true combination because the various steps in many cases influence succeeding steps and in some cases differ significantly from individual steps described in the related applications. In some cases the modification of a step may be considered as a new sub-combination apart from the overall process which is the primary subject matter of the present invention. These modified sub-combinations will be pointed out in the description below as they fit into the description of the overall process, and of course such sub-combinations are included within the scope of the present application.

In order to make the overall process clear, a brief summary of individual reactions is helpful. It should be noted that these reactions are illustrative reactions for a particular step and do not include modifications which are encountered in the overall process. Because we are dealing only with cyclohexanone and after cleavage only with 6-nitro or 6-amino caproic acid respectively, the term "nitrocyclohexanone" will be used to designate the 2-nitro ketone and the terms "nitro caproic acid" and "amino caproic acid" mean the 6-substituted acids in each case. The simpler term saves repetition of the numbering, and it should be understood that throughout the specification it will be used only in this sense. However, the individual reactions in the summary which follows will show the proper position of all substituents.

The first reaction deals with acetylation of cyclohexanone using ketene and acetic anhydride, and it is represented by the following equation:

Equation 1

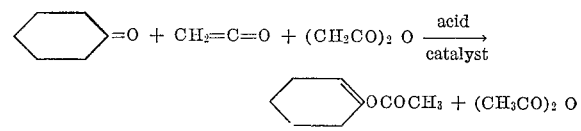

It will be noted that this is written as an overall equation, but in actual reaction the acetylation takes place almost entirely by acetic anhydride and the ketene serves to react with acetic acid formed in the acetylation to regenerate acetic anhydride. While ketene can theoretically react with cyclohexanone, its reaction rate is much slower than the reaction with acetic anhydride.

The second step is the nitration of cyclohexenyl acetate with acetyl nitrate formed by reaction of concentrated nitric acid with acetic anhydride, the former never being in any significant excess at any time during the reaction. However, a minute amount of nitric acid or other strong acid is used for a practical reaction rate. The reaction is represented by the following equation:

Equation 2

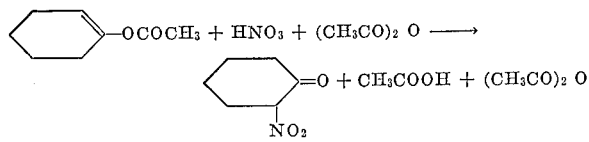

It will be seen that in the nitration both acetic acid and acetic anhydride are formed, the latter, as will be pointed out, can be recycled and the former used to produce ketene by conventional means.

The third step in the overall process is represented by the cleavage of nitrocyclohexanone with aqueous ammonia to form nitrocaproic acid. The equation is as follows:

Equation 3

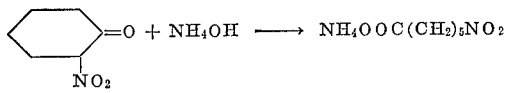

The next step is the reduction of nitrocaproic acid salt to amino caproic acid which exists in a zwitterion form and is represented by the following equation:

Equation 4

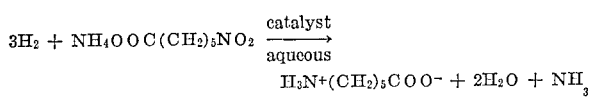

The final step of the process is the cyclization of aminocaproic acid to caprolactam. This is represented by the following equation:

Equation 5

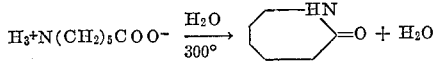

The reaction reaches a high conversion, about 80%–90%, very rapidly, and as will be described below, the caprolactam is separated from unreacted aminocaproic acid and water by a solvent extraction using typical water immiscible solvents for caprolactam, such as trichloroethylene, chloroform, benzene, chlorobenzene, toluene, xylene, and the like. The unreacted aminocaproic acid is, recycled to the cyclization step. The overall result is practically quantitative as there is no significant formation of other products, such as polymers or degradation products.

In the overall equations of steps 1 and 4, reference is made to a catalyst. In the case of Equation 4 this is a conventional hydrogenation catalyst, of which Raney nickel is a typical example. In the acetylation step (Equation 1), the catalyst can be a well known condensation catalyst, such as sulfuric acid, or the hydriodic acid referred to in one of the related applications above may be used.

It is an advantage of the present invention that in the various steps of the overall process temperatures and pressures are not particularly critical; they must, however, fall within a suitable range. In the acetylation step the reaction is exothermic, with a temperature of the order of 140° C. very suitable. At such temperatures there is a slight autogenous pressure of a few p.s.i.

It will be noted that in the acetylation stage there is a very substantial excess of acetic anhydride. While an excess is needed, the exact amount of excess is not sharply critical. A molar ratio of 2 moles acetic anhydride to 1 mole of cylohexanone is very suitable. Mush smaller excesses reduce the reaction efficiency somewhat, and of course larger excesses can be used, but as they do not greatly improve the reaction efficiency the aproximate 2:1 ratio is a very suitable and convenient one to use, but the invention is, of course, in no sense limited thereto.

Acetic anhydride from the acetylation step is advantageuosly recovered and recycled. It is desirable to flash the reactor effluent under moderate vacuum, for example a vacuum of the order of 50 mm. Hg is suitable. This is normally effected in more than one step. The first step can be followed by reheating and flashing at a lower pressure, for example of the order of magnitude of 10 mm. Hg, to strip off practically all of the acetic anhydride and cyclohexenyl acetate from the catalyst and residue before the latter are discarded to waste. Acetic anhydride and unreacted cyclohexanone are separated from the cyclohexenyl acetate and recycled.

The cyclohenexyl acetate is then reacted with acetyl nitrate produced from nitric acid and acetic anhydride. Acetic acid is formed in the reaction, and as it is not desirable to produce too much, the nitric acid should be quite strong, 70% to 99% being a workable range, with approximately 99%, representing concentrated nitric acid, preferred. As has been pointed out above, the nitric acid should at no time be present in significant excess excess over the acetic anhydride. The acetyl nitrate is formed very rapidly and the reaction goes to completion with essentially quantitative yields. However, in order to avoid the possible production of explosive mixtures, it is desirable to have a very substantial excess of acetic anhydride which is not wasted as it is later separated and recycled to the acetylation step. The particular excess is not critical, but it should be substantial and a molar ration of 2:1, acetic anhydride to nitric acid, is suitable and a ratio not departing too greatly from this figure is preferred. Too low an excess of acetic anhydride can result in possibly explosive mixture. Larger excesses simply increase the circulating load of acetic anhydride and so the excesses should be kept at moderate figures.

Since the nitration reaction is exothermic and acetyl nitrate is somewhat unstable, it is desirable to cool the reactor used in this step with a refrigerated jacket. Temperatures of the order of 20° C. have been found to be safe and desirable. The effluent from the acetyl nitrate production is mixed with a mixture of cyclohexenyl acetate and acetic anhydride and the nitration reaction then proceeds. This reaction is also exothermic and the temperature can be allowed to rise to from 30° to 50° C. A reaction temperature of the order of 35° C. is suitable, but this temperature is not sharply critical and so a very exact, precise control is unnecessary, which is an operative advantage. A slight excess of acetyl nitrate over that required to produce the nitrocyclohexanone speeds up the reaction and permits essentially quantitative yields of nitrocyclohexanone. The excess can be quite small, for example from 5% to 10%, but large excesses are not desirable.

The effluent from the nitroketone reaction is then subjected to stripping and absorbing, the excess acetyl nitrate being stripped under a vacuum which can be of the order of 50 mm. Hg. The exact value is not critical but a substantial vacuum is needed to keep the temperature of the acetyl nitrate below 60°–80° C. and preferably not substantially greater than 70° C. This temperature, again, is not sharply critical but permits minimizing decomposition of the acetyl nitrate, which is unstable at higher temperatures. The stripping of the acetyl nitrate produces vapors in which the acetyl nitrate is diluted with acetic acid and acetic anhydride which are absorbed in acetic anhydride and returned to the nitroketone reactor. The small excess of acetyl nitrate is, therefore, not wasted but is reused.

The stripper bottoms, which consist of acetic acid, acetic anhydride and nitrocyclohexanone, are separated in vacuum flash operations. This is desirable as the nitrocylohexanone is somewhat heat sensitive. The first flash zone, which can also be under moderate vacuum of the order of 50 mm. Hg, should preferably be at a temperature not exceeding 100° C. A temperature of approximately 90° C. is quite suitable. In the vacuum flash the bulk of the acetic acid and acetic anhydride are flashed and are preferably scrubbed in a packed column to remove nitrocyclohexanone. The vapors are then condensed and fed into a distillation column where acetic acid and acetic anhydride are separated. This distillation may be at atmospheric pressure and serves to separate the two products. The acetic acid is recycled to the ketene producer to generate the ketene required. The acetic anhydride is cooled and recycled to the acetyl nitrate and nitrocyclohexanone reactors. The small amount of nitrocyclohexanone which is removed in the scrubber packed section referred to above is accompanied with acetic acid and acetic anhydride and is recycled to the vacuum flash. The liquid bottoms product from the vacuum flash is again flashed at a temperature of the order of 90° C. and a high vacuum, which may be as high as 1 mm. Hg. This removes the acetic acid and acetic anhydride so that the nitrocyclohexanone may contain as little as 1% or less. This product is cooled and stored.

The nitrocyclohexanone is then reacted with aqueous ammonia which, may, for example, be about 3 N ammonia solution. The ammonia should be in slight excess, for example 5% to 10% excess, and this permits quantitative reaction of the nitrocyclohexanone to ammonium nitrocaproate. The temperature is not critical but should be somewhat above ambient, temperatures from 40° to 60° C. being quite suitable. The reaction mixture constitutes a homogeneous liquid phase. This is then passed through a packed column plug flow reactor where an additional reaction time of about 30 minutes can be provided. The reaction proceeds to completion and, if necessary, is then filtered, for example through an activated carbon filter. This effects decolorization, but more important yet it removes impurities produced in the preceding steps and protects the Raney nickel catalyst used in the hydrogenation step, which will be described, and also simplifies final caprolactam purification.

The aqueous ammonium nitrocaproate solution is then hydrogenated with a Raney nickel catalyst at temperatures slightly below 100° C., for example about 90° C., under approximately 20 atmospheres pressure. The reaction is exothermic and the reactor must be cooled to control temperatures. The amount of Raney nickel catalyst is not critical; excellent results are obtained with about 6 grams of Raney nickel catalyst per gram mole of ammonium nitrocaproate, and permits substantially quantitative conversion to aminocaproic acid.

The aminocaproic acid solution, which contains some ammonia which is formed in the hydrogenation, then passes through micro filters, such as porous metal micro filters, which retain the Raney nickel catalyst. This filtration should take place in the hydrogenation reactor so that the Raney nickel catalyst is reslurried from the filters by the intensive agitation which is conventional in hydrogenation reactions. The aminocaproic acid solution containing the ammonia is then stripped of substantially all of the ammonia, which is condensed with some accompanying water in an ammonia condenser and recycled to the cleavage reaction.

The aminocaproic acid in 5% to 25% aqueous solution is then cyclized by heating under high pressure, for example at a temperature of the order of 300° C. This temperature is not critical, and temperatures from 260° C. to 350° C. may be used. The pressure should be sufficient so that water does not vaporize. Pressures of the order of 100 atmospheres are satisfactory at the 300° C. temperature. Cyclization proceeds to an equilibrium of about 85% caprolactam in a very short time, a few minutes. The yields of the reacted material are substantially quantitative. The hot aqueous solution is rapidly flash cooled to freeze equilibrium and to generate steam at a pressure sufficiently high to be useful in subsequent parts of the process for heating. The pressure may, for example, be from 110 to 130 pounds gauge, and the liquid from which steam has flashed is then cooled in a heat exchanger and subjected to counter-current extraction with a solvent such as trichloroethylene to extract the caprolactam. The trichloroethylene can be in quite larger excess; for example 27 moles of trichloroethylene per mole of caprolactam can extract 99% of the caprolactam from a solution having 1.55 molar concentration of caprolactam and 0.26 molar concentration of aminocaproic acid. The extractor can be of quite moderate size, with from 6 to 10 theoretical plates.

The aminocaproic acid, from which the caprolactam has been removed, is then heated and stripped of residual solvent. The stripped solution is recycled to the cyclization reactor and the stripped solvent decanted from accompanying water and reused. The caprolactam solution in the solvent is freed of solvent by evaporation, which should be at moderate temperatures, not substantially exceeding 130° C., to avoid caprolactam polymerization. The solvent vapors are condensed and the caprolactam liquid freed of the last of the solvent by vacuum evaporation, the solvent vapors from this step of course being refrigerated. The crude caprolactam is cooled and constitutes the final product of the present process. It is substantially free from polymers and can be purified by conventional caprolactam purification procedures which, as such, form no part of the present invention.

BRIEF DESCRIPTION OF THE DRAWINGS

FIG. 3 is a semi-diagrammatic representation of an alternative acetylation plant;

FIGS. 4A and 4B represent semi-diagrammatically a nitration step;

FIG. 5 represents cleavage and hydrogenation; and

FIGS. 6A and 6B represent cyclization and extraction steps.

DESCRIPTION OF THE PREFERRED EMBODIMENTS

In the following description dealing with the drawings, it should be noted that the representation is semi-diagrammatic. Flows of various materials are shown by arrows, and all circulators, such as pumps and the like, are omitted so as not to confuse the drawings. Certain other abbreviations have been used. For example, in various condensers or heaters, cold water is represented by CW, steam by STM, vacuum by VAC, flow controllers FC, back pressure control valve PC, etc. In general, since most of the pieces of equipment are of more or less standard design, no design details are shown. Also, in general, temperatures and pressures are not shown as these have been generally set forth in the summary of the invention and as extensive numerical representation would confuse the drawings.

Figure 1:
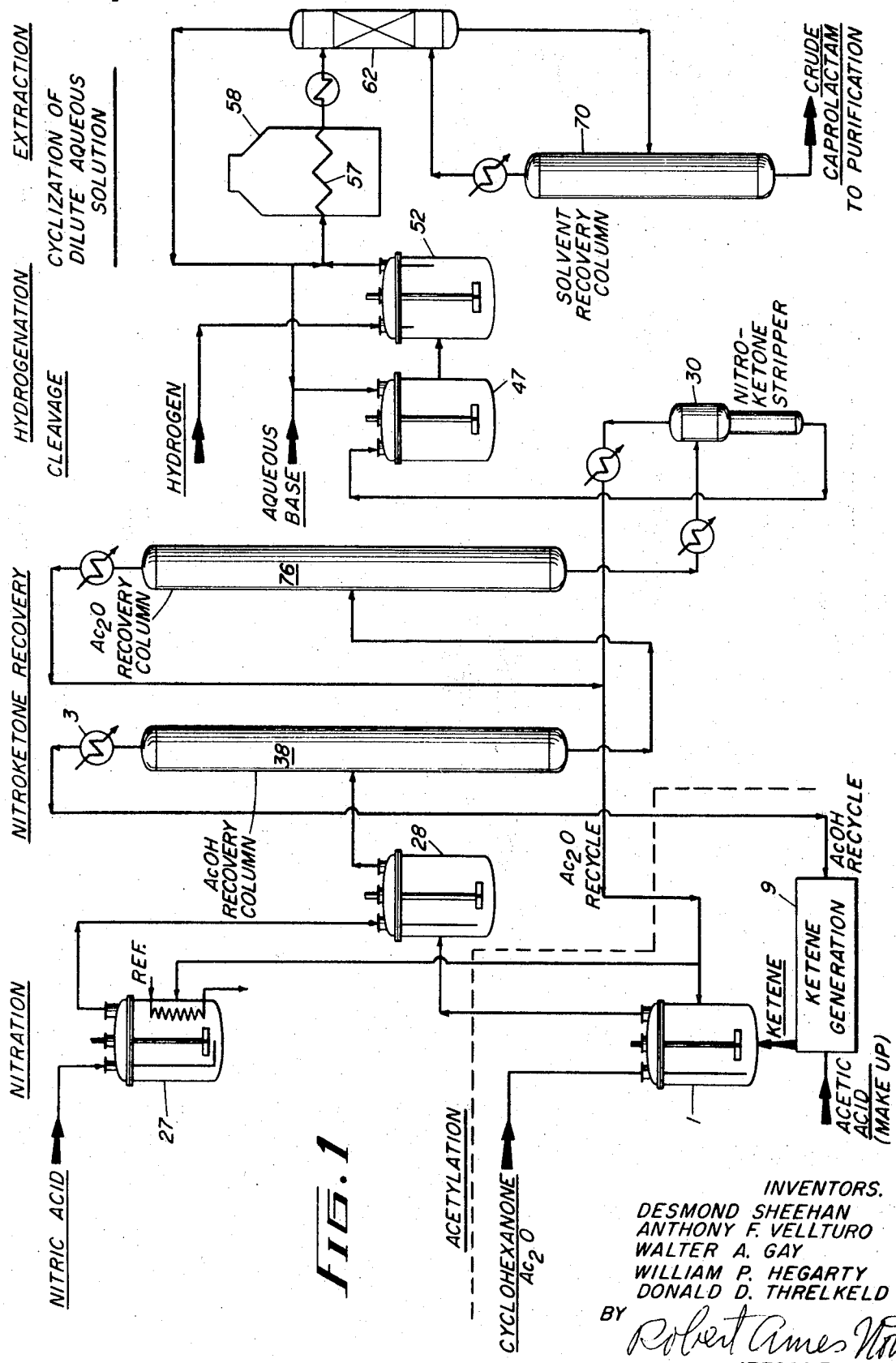
FIG. 1 is a simplified semi-diagrammatic flow scheme of the process.

FIG. 1 is a highly simplified diagram. Pieces of equipment which appear on the other figures of the drawing represent, even though in semi-diagrammatic form, an overall plant and are given the same reference numerals on the simplified drawing of FIG. 1.

Cyclohexanone is introduced into an acetylation reactor 1, which receives ketene from a conventional ketene generator, which is commercially available and is, therefore, shown in pure diagram form as the rectangle 9. The cyclohexanone is introduced mixed with acetic anhydride which is in very substantial excess, for example about 2:1. Acetic anhydride is also recycled from certain other pieces of equipment as shown on the drawings. The acetic acid for the ketene generation is partly makeup acetic acid and partly recycled acetic acid. A catalyst is introduced with the cyclohexanone and acetic anhydride and may be a conventional sulfuric acid catalyst or the hydriodic acid referred to in one of the related applications.

Cyclohexanone reacts with the acetic anhydride to produce cyclohexenyl acetate and acetic acid. The latter is continuously reacted with the ketene and transformed into acetic anhydride. There is a slight direct reaction of ketene with the cyclohexanone, but as it is much slower than the reaction with acetic anhydride the primary function of the ketene is to regenerate acetic anhydride from acetic acid. The reaction is exothermic and the reactor is cooled by a jacket, which is not shown. The reaction may be maintained at about 140° C., which results in a slight autogenous pressure of a pound or two.

The cyclohexenyl acetate is introduced into a nitrator 28 into which acetyl nitrate and excess acetic anhydride are introduced from the acetyl nitrate reactor 27. The acetic anhydride is in substantial excess, for example a molar ratio of about 2:1. The amount of acetyl nitrate may be in small excess over the cyclohexenyl acetate, for example 5% to 10% excess, and as the reaction is strongly exothermic the reactor 28 is provided with a cooling jacket, which is not shown. The temperature is preferably maintained at about 35° C., and the incoming acetyl nitrate is at about 20° C. Essentially quantitative yields of nitrocyclohexanone result.

From the reactor 28 the mixture of nitrocyclohexanone, acetic anhydride and acetic acid are introduced into recovery columns 38 and 76. The vapors from column 38 after condensing in a condenser 3 and consisting essentially of acetic acid are recycled to the ketene generator 9. The column 76 removes acetic anhydride, the vapors after condensation being recycled to the acetylation reactor 1. The nitrocyclohexanone, which contains some acetic anhydride, is then stripped in the stripper 30. On the drawings the nitrocyclohexanone has been shortened to nitroketone.

The nitrocyclohexanone then passes to a cleavage reactor 47, where it is reacted with ammonium hydroxide using a small excess, 5% to 10%, of ammonium hydroxide and is cleaved to ammonium nitrocaproate. This is then introduced into a hydrogenator 52 where hydrogenation to aminocaproic acid is effected with hydrogen using a Raney nickel catalyst.

From the hydrogenator the aqueous aminocaproic acid, after removing ammonia (which is not shown on FIG. 1), is from 5% to 25% in concentration and is then cyclized to caprolactam in the direct-fired heater 57 to about 300° C. Pressures of approximately 100 atmospheres are maintained to prevent vaporization of the water. The caprolactam is then passed into an extractor 62 through a suitable pressure control system and cooler, which are described in connection with FIG. 6A. In the extractor the caprolactam is extracted with a large excess of organic solvent such as trichloroethylene and the solvent removed from a solvent recovery column 70. The resulting crude caprolactam is the final product of the overall process. Details of the caprolactam extraction and solvent recovery are not shown in FIG. 1 in order not to confuse the essentially flow sheet character of the drawing. They will be described in connection with FIGS. 6A and 6B.

It will be seen that there is extensive recycling and no production of waste ammonium salt. The acetic anhydride and acetic acid are recycled, and essentially the makeup is acetic acid, which is shown transformed into ketene. The nitric acid forms the nitro compound and the nitro group eventually is reduced to the amino group in aminocaproic acid. The ammonia is recycled for cleavage, and the amino group in the aminocaproic acid forms the lactam ring.

Figure 2:
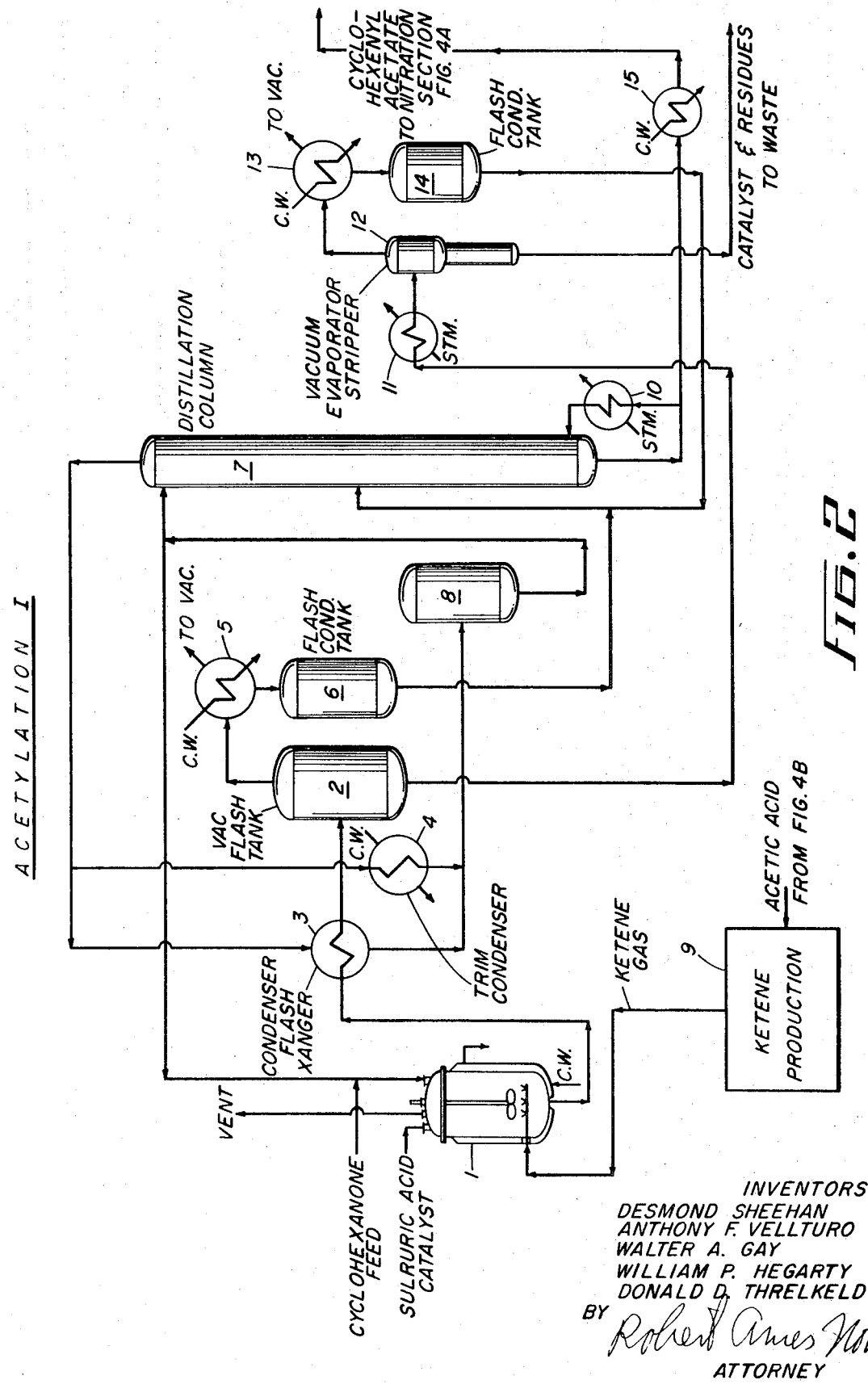
FIG. 2 is a diagrammatic representation of an acetylation plant.

FIGS. 2 to 6B show the steps generally set forth above in connection with FIG. 1 in more detail and also show variants. FIG. 2 shows in more detail one form of acetylation. The ketene formation is essentially the same as is described in connection with FIG. 1, and the recycled acetic acid, which is shown as coming from FIG. 4B, which will be described below, is also the same. The ketene is introduced into the acetylating reactor, which is provided, as shown, with a cold water jacket, and cyclohexanone and acetic anhydride are introduced with a small amount of a catalyst, which is shown on the drawing as sulfuric acid. As has been described above, the reaction essentially takes place in two stages, the acetic anhydride reacting with the cyclohexanone to produce cyclohexenyl acetate and the ketene transforming acetic acid formed into acetic anhydride. The reaction may be conducted at about 140° C. with a slight autogenous pressure of a pound or two and with about 12 mmoles of sulfuric acid catalyst per mole of cyclohexanone. In a few minutes the acetylation reaction proceeds about 90%. As will be described, unreacted cyclohexanone is recycled and the net overall yield is substantially quantitative.

The reactor effluent, which contains cyclohexenyl acetate and excess acetic anhydride together with some unreacted cyclohexanone, is flashed into a vacuum flash tank 2 through a heat exchanger 3. The flash zone is operated at about 80° C. with a pressure of the order of 50 mm. Hg. Vapors pass through the vacuum condenser 5 into a flash condensate tank 6. From the flash tank 2 the liquid is heated in a heater 11 to about 130° C., then flashed in a second vacuum flash tank 12 at a lower pressure of about 10 mm. Hg. Liquid from this second flash is further stripped, preferably by means of a falling-film or wiped-film evaporator to remove acetic anhydride and cyclohexenyl acetate from catalyst and residue, which latter are discharged to waste as shown.

The vapors going through the vacuum condenser 13 go to a flash condensate tank 14 from which they join the condensate from tank 6 and are introduced into a distillation column 7. The distillate, containing acetic anhydride, unreacted cyclohexanone and acetic acid, is recycled to the reactor 1. It will be noted that there is a portion of the distillate which goes through the heat exchanger 3 and the remainder is cooled in a trim condenser 4, the total distillate finally entering a tank 8 from which a portion is returned to the column as reflux and the remainder is returned to the reactor 1. The bottoms from the column 7, after cooling in the cooler 15, pass on to the nitration section in FIG. 4A. Heat for reflux is provided in the column 7 by the reboiler 10.

Figure 3:
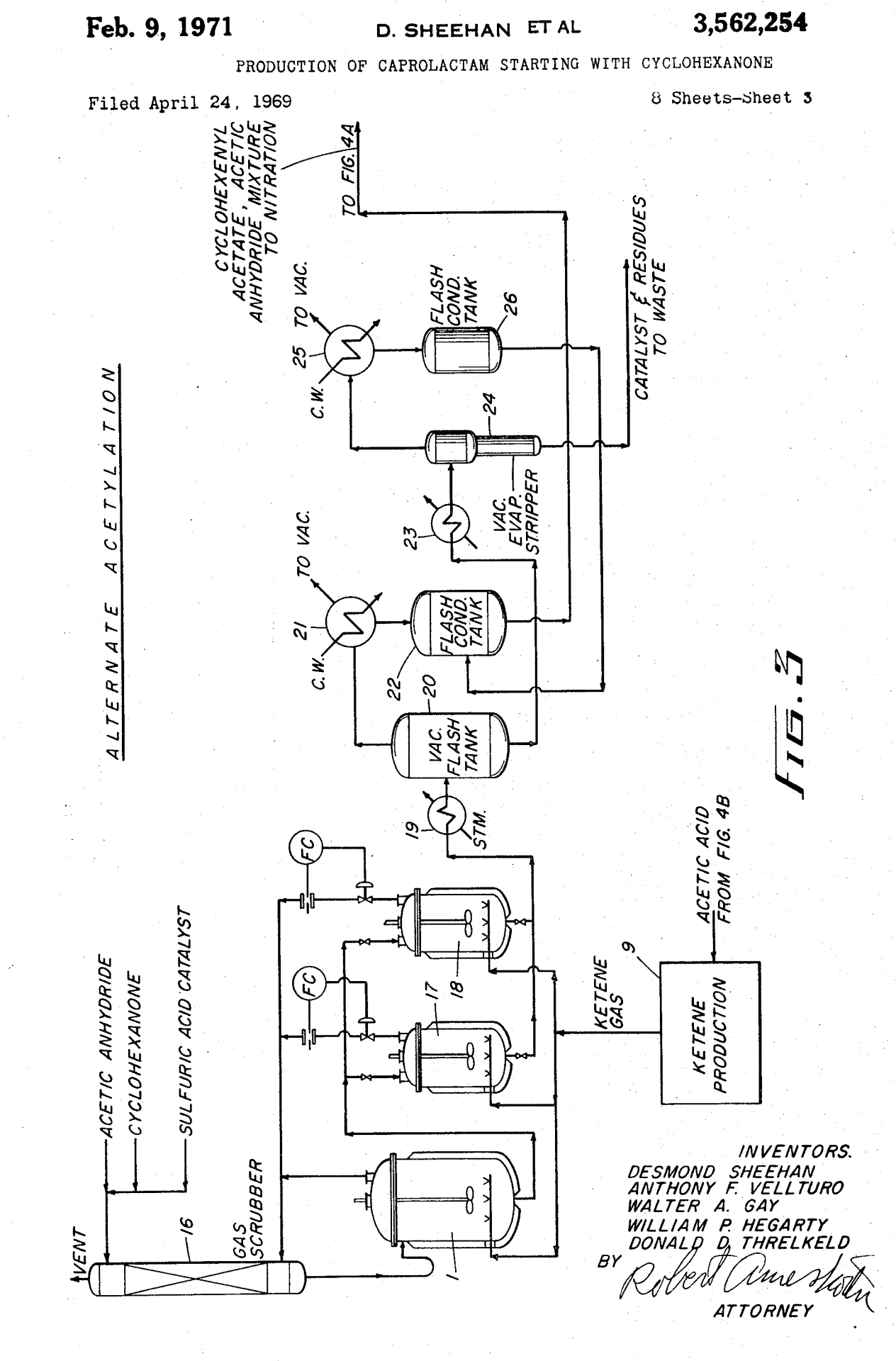

An alternate method of acetylation is shown in FIG. 3. This is a semi-batch reaction system which has the advantage of eliminating the recycle distillation operation of FIG. 2 and saves somewhat on equipment and steam. The reactor 1 and the ketene generator 9 are the same as in FIG. 2 but acetic anhydride, cyclohexanone and catalyst are introduced into a vent gas scrubber 16, which also receives vent gases from the acetylating reactors 1 and 17 and 18. From this scrubber the the scrubbed cyclohexanone, acetic anhydride and catalyst are introduced into the reactor 1, where they react to form cyclohexenyl acetate, with the acetic acid formed being transformed into acetic anhydride by ketene as described in conjunction with FIG. 2.

The liquid from the bottom of reactor 1 is introduced into two batch reactors 17 and 18. These are operated alternately and each receives ketene in the same manner as reactor 1. They are also the same type with cooling jacket. A slight excess of ketene is introduced so that the particular reactor which is operating, for example reactor 17, has the reaction driven to completion. These reactors can be switched on and off as one completes the reaction. Vapors are vented through the flow controllers FC into the scrubber 16. It will be noted that the reaction mixture which has not gone entirely to completion in reactor 1 is introduced into reactors 17 and 18 as they are successively cut onto stream, while reactor 1 acts as a sink for the complete absorption of ketene so that the ketene plant production can be held steady in spite of cyclic demand characteristics of the batch reactors 17 and 18. Reactor 1 is made somewhat over-size and provides for a continuous presence of some acetic acid which assures complete absorption of ketene introduced.

The reactors 17 and 18 are operated on a staggered time cycle. While a charge is reacting in one, the other serves as a feed tank for a double vacuum flash. This is effected with a heater 19, first vacuum flash tank 20, and a second flash tank 24. Vacuum condenser 21 is provided and vapors are condensed into the flash condensation tank 22. From the second vacuum flash tank 24, which is provided with a vacuum condenser 25, the vapors are condensed into the second flash condensation tank 26 from which they are recycled to the flash condensation tank 22. From the second vacuum flash tank 24 catalyst and residue are rejected to waste in the same manner as in FIG. 2 from the tank 12. From the flash condensate tank 22 the cyclohexenyl acetate, acetic anhydride mixture is then passed onto nitration in FIG. 4A, as indicated on the drawing.

It will be noted that the mixture passed to nitration already contains the required amount of acetic anhydride. Because of this the acetic anhydride to the scrubber 16 can be recycled from the nitration still 38 in FIG. 4B, which will be described. The alternative, whether the recycle is to reactor or to a stripper absorber, is indicated.

Turning to FIG. 4A, the cyclohexenyl acetate from FIGS. 2 or 3 passes into a nitrator 28 into which there is introduced acetyl nitrate from the reactor 27 in which concentrated nitric acid is reacted with acetic anhydride as has been described in conjunction with the simplified drawing FIG. 1. Nitration takes place in the nitrator 28. The temperatures and excesses of acetic anhydride are the same as described in connection with FIG. 1 and so is the small excess of 5% to 10% of acetyl nitrate.

From the nitrator 28 the liquid is introduced into a stripper-absorber, which is shown at 29 and 30, the introduction being through a distributer 31. In the stripping section 29 excess acetyl nitrate is stripped under a vacuum, which may be about 50 mm. Hg, which limits bottoms temperature to about 70° C. and minimizes decomposition of acetyl nitrate, which is not temperature stable. Boilup is provided by heater 32. The stripped acetyl nitrate vapors, diluted with acetic acid and acetic anhydride, flow from the stripper section through a chimney trap into the absorber section, where they are absorbed in acetic anhydride feed on route to the nitrator 28. This completes the recycle of excess acetyl nitrate.

The stripper bottoms, which contain acetic anhydride, acetic acid and nitrocyclohexanone, are then separated by vacuum flash operations. The stripper bottoms, which are free of acetyl nitrate, are heated in heater 34 and pass into a flash scrubber 33. It should be noted that not only are bottoms from the absorber 30 heated by the heater 34, but there is also recycle from the flash condensate tank 36, (FIG. 4B).

The flash zone temperature in flash scrubber 33 may be maintained at slightly below 100° C., for example 90° C., with a moderate vacuum, of the order of 50 mm. Hg. Here the bulk of the acetic acid and acetic anhydride are flashed and scrubbed in a packed section, indicated by the crossed lines, to remove any nitrocyclohexanone and are finally condensed in a flash condenser 37, which is shown on FIG. 4B flowing into a flash condensation tank 36, which has been referred to above. Most of the liquid from the flash tank 36 is introduced into a distillation column 38, only a small portion refluxing back into the packed portion of the flash scrubber 33 to knock down any nitrocyclohexanone which may remain. This is shown on FIG. 4B together with the other portions of the nitration step.

Column 38 is operated at atmospheric pressure and acetic acid and acetic anhydride are separated. The acetic acid is fed to ketene production and the acetic anhydride bottoms are cooled and recycled. The bottoms from the flash scrubber 33 are heated in a flash heater 42 and flashed into vacuum evaporator-stripper 43, which is at a much higher vacuum, for example of the order of 1 or 2 mm. Hg, with flash conditions set just under 100° C., for example about 90° C. This strips essentially acetic acid and acetic anhydride, leaving less than 1% in the nitrocyclohexanone, which is in the liquid from the tank 43. This is cooled by the cooler 46 and goes on to cleavage, shown on FIG. 5. The liquid from flash tank 45 is returned to the flash scrubber 33 on FIG. 4A.

FIG. 5 illustrates the operations of cleavage and hydrogenation. The nitrocyclohexanone from FIG. 4B is introduced at the bottom of a reactor 47 and dispersed through the distributer into an ammonium hydroxide solution, for example about 3 N, which is in slight excess, for example 5% to 10% excess. Agitation is effected and the cleavage reaction proceeds with moderate heating, for example to about 50° C., to about 60% in approximately 30 minutes. Then the mixture flows through a packed column, plug flow reactor 48 where the reaction is completed.

The aqueous ammonium nitrocaproate produced is then filtered in an activated carbon filter 49 and passes into a hold tank 50. The purpose of filtration is both to decolorize and, what is probably more important, to remove any solid impurities. This also increases the purity so that the purification of the final caprolactam is simplified.

From the tank 50 the solution is introduced into a hydrogenator 51 and hydrogen gas is introduced as indicated. The reactor contains a slurry of Raney nickel catalyst in a fine state of subdivision. The amount of catalyst is not critical but 6 grams per gram mole of nitrocaproic acid gives excellent results with conversions up to 99%. Hydrogenation is effected at slightly under 100° C., for example about 90° C., with pressure approximately 10-40 atmospheres. Substantially quantitative yields of aminocaproic acid result. In the reactor there is a micro filter 52, for example of porous metal, which holds back the Raney nickel catalyst and which is washed off the surface of the filter by the intense agitation in the hydrogenator.

The filtered solution is then introduced into an ammonia stripper 53 with a heater 54. The ammonia vapors, with a considerable amount of water, are condensed in the condenser 55 flowing into the tank 56 where they are recycled to the cleavage reactor 47.

Figure 6A:
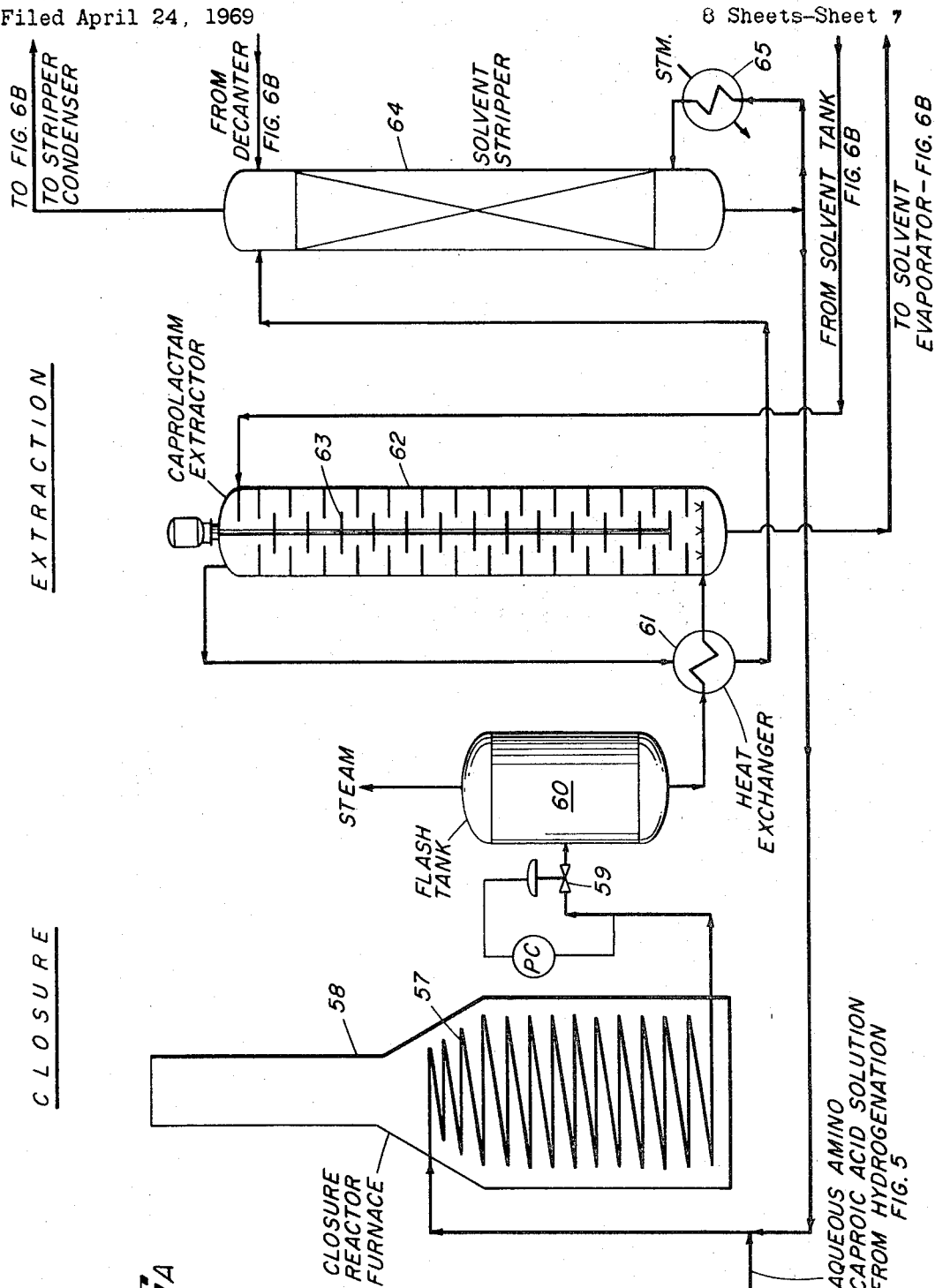

The aqueous aminocaproic acid solution, if necessary with some adjustment in concentration to an aminocaproic acid concentration of from 5% to 25% and preferably from 5% to 10%, then passes to a cyclization or closure portion of the plant, which is shown on FIG. 6A. Cyclization may be effected in the tubes of a direct-fired heater 57. The temperature is of the order of 300° C. and sufficient pressure is maintained so that ammonia and water do not vaporize, for example about 100 atmospheres. With a 1.6 molal aminocaproic acid feed, an equilibrium conversion of 85% is obtained in a few minutes with essentially quantitative yields, that is to say, the unreacted material is not contaminated with any significant amounts of undesired materials, such as polymers. The solution containing caprolactam and some unreacted aminocaproic acid is then introduced into a flash tank 60 through a pressure control valve 59. Steam is flashed off at a useful pressure, for example between 120 and 130 pounds, which steam can be used in the steam heaters shown elsewhere on the drawings. The liquid from the tank 60 is then cooled in the heat exchanger 61 and charged into a caprolactam extractor 62 which is provided with an agitator 63. Trichloroethylene is introduced at the top of the extractor from a solvent tank which will be described in connection with FIG. 6B. The trichloroethylene is present in large excess, for example about 27 moles of trichloroethylene per mole of caprolactam for a solution having 1.55 molar concentration of caprolactam and 0.26 molar concentration of amino caproic acid. Extraction is under ambient temperature and a 99% extraction is obtained with six theoretical plates.

From the extractor the aminocaproic acid solution, from which substantially all of the caprolactam has been removed, is reheated in the heat exchanger 61 and introduced into a solvent stripper 64 provided with heat by the heater 65. Solvent is stripped off and after condensation in the condenser 66 enters a decanter 67 (both shown in FIG. 6B), the aqueous phase being returned to the solvent stripper 64 as shown. The solvent then passes through a trap into a solvent tank 68.

The caprolactam solvent solution from the extractor 62 flows into a solvent evaporator 70. The evaporated solvent vapors are condensed by the condenser 69 and are returned, together with the decanted solvent, to the solvent tank 68. From the solvent evaporator 70 the caprolactam liquid is then passed into a falling-film solvent evaporator 71. Temperature in the solvent evaporator 70 is kept below about 130° C. to avoid polymerization. From the solvent film evaporator, which operates on a vacuum as shown by the refrigerated condenser 73, the crude caprolactam, after cooling in a cooler 74, is discharged to final purification, which is not shown as it forms no part of the present invention. The condensed solvent vapors flow into a tank 72 from which they are returned to the solvent tank 68.

The plant using the present invention is not limited to particular materials of construction. However, of course, they must be suitable for the temperatures and pressures involved and also in some of the steps there is a significant corrosion problem because the liquids can corrode ordinary steel. Stainless steel in many cases can be used or ceramic or glass lined equipment. In general the present invention is in no sense limited to any particular material, and it is an advantage that equipment constructed of conventional materials can be used.

The invention has been described in connection with the production of caprolactam itself. However, some of the individual steps and even some of the equipment types are useful for processes which start with other cyclic ketones. These ketones have been described in the related applications Ser. Nos. 664,231 and 774,208. Typical examples of these cyclic ketones which can be used as starting materials are cyclooctanone, cyclododecanone, 3,3,5-trimethylcyclohexanone, and the like.

I claim:
1. A combined process for preparing caprolactam from cyclohexanone which comprises in combination:
   (a) acetylation of cyclohexanone by acetic anhydride in excess and ketene which is introduced in amounts not greatly in excess of that theoretically required for transforming acetic acid formed in the acetylation reaction to acetic anhydride, whereby the acetylation product produced is cyclohexenyl acetate,
   (b) flashing under vacuum and stripping acetic anhydride and cyclohexenyl acetate from any residue and separating acetic anhydride together with unreacted cyclohexanone from the cyclohexenyl acetate,
   (c) recycling acetic anhydride and cyclohexanone to step (a),
   (d) reacting the cyclohexenyl acetate without further purification with acetyl nitrate and excess acetic anhydride, the acetic anhydride during the whole of the reaction being sufficient so that free nitric acid is minimized, the temperature of reaction being maintained below 50° C. and the acetyl nitrate being in small excess over the cyclohexenyl acetate, whereby 2-nitrocyclohexanone is produced.
   (e) stripping excess acetyl nitrate under a vacuum below the decomposition temperature of acetyl nitrate, absorbing the acetyl nitrate in acetic anhydride and recycling to the nitration step.
   (f) flashing the 2-nitrocyclohexanone mixture produced at a temperature below 100° C. under vacuum to remove acetic acid and acetic anhydride,
   (g) cleaving the 2-nitrocyclohexanone with aqueous ammonium hydroxide in excess to produce ammonium 6-nitrocaproate.
   (h) filtering the product free of undesirable impurities,
   (i) hydrogenating the 6-nitrocaproate at elevated temperatures and pressures in the presence of a hydrogenation catalyst,
   (j) stripping off ammonia and recycling to the cleavage step,
   (k) cyclizing the 6-aminocaproic acid in aqueous solution from 5% to 25% w./v. by heating at high temperatures and pressures,
   (l) treating the cyclized solution with an excess of an organic solvent for caprolactam substantially immiscible in water,
   (m) removing the caprolactam solution, and
   (n) removing the organic solvent from the caprolactam and recycling to step (l).

2. A process according to claim 1 in which the removal of organic solvent is at a temperature below that at which substantial polymerization of caprolactam takes place.

3. A process according to claim 2 in which the hydrogenation step is effected with a Raney nickel catalyst.

4. In a process of producing caprolactam from cyclohexanone in which the cyclohexanone is acetylated to cyclohexenyl acetate, the cyclohexenyl acetate is nitrated with acetylnitrate in an excess of acetic anhydride to produce 2-nitrocyclohexanone, which is cleaved with ammonium hydroxide to produce ammonium 6-nitrocaproate, the ammonium 6-nitrocaproate is reduced with hydrogen and a hydrogenation catalyst to 6-aminocaproate and the 6-aminocaproate in aqueous solution is cyclized to caprolactam, the improvement which comprises removing by filtration from the 2-nitrocyclohexanone undesired impurities.

References Cited

UNITED STATES PATENTS 2,763,644  9/1956  Donaruma _____ 260—239.3

HENRY R. JILES, Primary Examiner

R. T. BOND, Assistant Examiner